US005568108A

United States Patent [19]

Kirsch

[11] Patent Number: 5,568,108

[45] Date of Patent: Oct. 22, 1996

[54] SECURITY RELAY WITH GUIDED SWITCH STACK AND MONOSTABLE DRIVE

[76] Inventor: Eberhard Kirsch, Rubäckerstr, 9, Wehingen, Germany, 78564

[21] Appl. No.: 304,965

[22] Filed: Sep. 12, 1994

[30] Foreign Application Priority Data

Jan. 13, 1993 [DE] Germany .......................... 43 00 594.2

[51] Int. Cl.[6] .................................................... H01M 67/02

[52] U.S. Cl. ................................ 335/130; 335/80; 335/78

[58] Field of Search ................................ 335/78–80, 124, 335/128, 130

[56] References Cited

U.S. PATENT DOCUMENTS 4,922,216 5/1990 Dietrich .................................... 335/83

5,144,271 9/1992 Schedele .................................. 335/80

*Primary Examiner*—Lincoln Donovan

*Attorney, Agent, or Firm*—Baker & Daniels

[57] ABSTRACT

A safety relay has a guided contact set and a monostable drive with a H-armature. The individual contacts of the set of contacts are located in separate chambers and are actuated by a common armature. In order to miniaturize the relay while having a low power consumption, a mechanically symmetrical H-armature with an asymmetrical magnetic effect is provided to ensure the monostable drive. The longitudinal axis of the H-armature is approximately parallel to the longitudinal axis of the driving coil and the axis of rotation of the H-armature is perpendicular to the longitudinal axis of the driving coil. The actuator is actuated by an actuating plate which prolongs the H-armature.

4 Claims, 3 Drawing Sheets

SECURITY RELAY WITH GUIDED SWITCH STACK AND MONOSTABLE DRIVE

SUMMARY OF THE INVENTION

The object of the present invention is to provide a security relay according to the superimposed concept of claim 1. Such a security relay has become known through several patents of the inventor, whereby the stack switch is guided and the individual contacts are closed off from each other so that with the break of a contact spring, it is prevented from entering the chamber of the neighboring contact spring.

A restricted guidance of this stack switch bank means, in a known manner, that the actuator grasps all of the switching springs and moves them to one or the other position.

Such a security relay has proved itself in an extensive range; however it is desirable that for its operation, a smaller power consumption be used and that the total relay be miniaturized. It is therefore the object of the invention to so construct a security relay such as that mentioned in the introduction, that with smaller power consumption, a miniaturizing of the entire relay ensues.

For the solution of the assigned task, the invention is characterized by means of the technical gauge of claim 1.

An essential characteristic of the invention is that now the known drive system with a cutout blade according to the invention is replaced by means of a drive system with an asymmetrically working H-armature, and that this H-armature is arranged with its longitudinal axis somewhat parallel to the longitudinal axis of the drive coil and that the drive axis of this H-armature is arranged perpendicular to the longitudinal axis of the drive coil and that furthermore the H-armature is constructed magnetically asymmetrical.

With the given technical gauge there arises the essential advantage, that with a relay with a guided stack switch, which because of the restricted guidance of the contacts, requires relatively large contact intervals and therefore presupposes a relatively great lifting of the drive system, this presupposition is now guaranteed by means of magnetic-asymmetrically working H-armature.

An H-armature permits a great lifting, which works symmetrically, as long as the H-armature is constructed to work magnetically symmetrical.

With a magnetic-asymmetrically working H-armature, a monostable behavior of the relay can be effected.

With the use of an H-armature there is the advantage that a power lift curve is achieved whose end strengths are independent of the lifting.

A nonpolarized relay with a cutout blade does not have this characteristic, since with a cutout blade the beginning power is reduced with an increasing lifting, that is, the beginning power is dependent on the lifting, while this is not the case with an H-armature.

The beginning power hereby means the power which becomes necessary to bring the contacts of the stack switch out of the resting position. In order to be able to miniaturize such a relay in its entire volume, all the components of this relay are first of all made smaller, which naturally has the disadvantage that the contact intervals between the individual springs become relatively smaller, whereby the previously described minimal distances between the contact springs fall short. Here, however, a large contact interval is maintained, which allows a large lifting of the drive system.

Symmetrical H-armatures offer the possibility of achieving large lifting paths, which simultaneously effects a bistable behavior of the drive. In order to achieve a monostable behavior according to the invention, the H-armature in its magnetic action is shifted to the mechanical symmetry. The end strengths of the drive thereby become asymmetric, whereby a monostable behavior is achieved.

The definition of a monostable behavior is that after omission of the drive excitation, the stack switch moves itself automatically out of the working position into the resting position.

The essence of the invention therefore lies therein, that a security relay of reduced volume, such as that described in the introduction, still has the same contact intervals such as those present in an essentially larger security relay. The consequent necessary enlargement of the lifting is made possible by using an H-armature.

The object of the present invention arises not only from the object of the individual patent claims, rather from the combination of the individual claims taken together. All of the statements published in the documents, including the summary, especially the spatial development represented in the drawings are claimed as essential to the invention, in so far as they individually or in combination are new to the state of the art.

In the following invention is more closely illustrated by means of only one design type. Hereby from the drawings and their description further characteristics and advantages of the invention are made clear.

BRIEF DESCRIPTIONS OF THE INDIVIDUAL FIGURES OF THE DRAWINGS

DETAILED DESCRIPTION OF THE DRAWINGS

Figure 1:
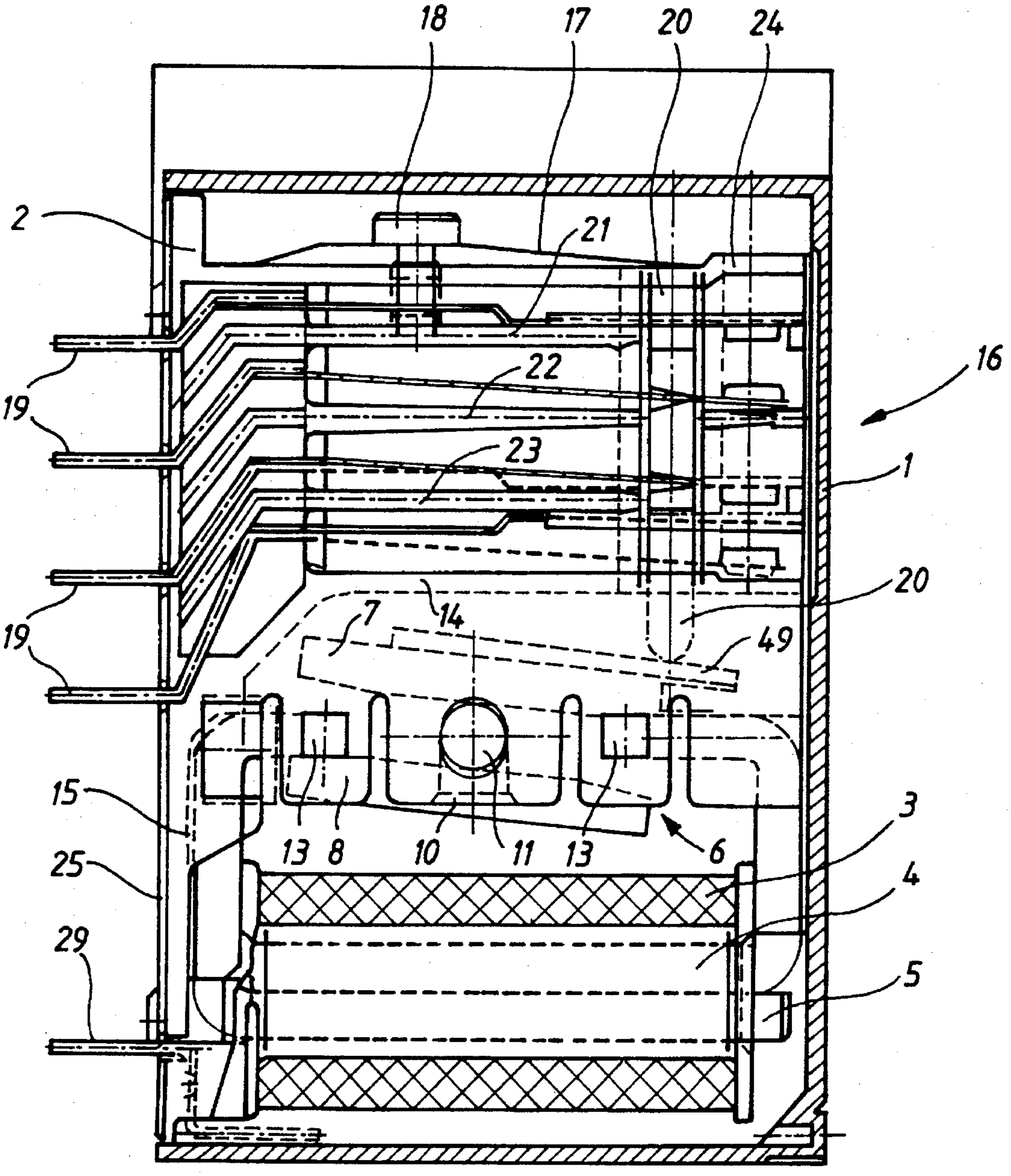
FIG. 1 is a schematic cross section through a relay according to the invention.

Relative to the function of a security relay according to the invention, reference is made to the older patents of the present inventor, the disclosures of which are to be considered encompassed in the present disclosure.

The relay has a cap 1 which overlaps a stack switch carrier 2 which, as a single plastic piece, contains a row of components of the relay.

In the stack switch carrier 2, the complete drive of the relay is engaged as an engaging piece, whereby the drive coil 3 is engaged with the yoke branches 4, 5 and with the H-armature 6 as a joined piece in the stack switch carrier. The yoke branches thereby grip the branches 4, 5 with lateral flanges in appointed recesses 13 at the stack switch carrier 2, and are there latched.

The H-armature has in its rotation axis a bearing neck, not shown in detail, which likewise grips into a predetermined recess in the stack switch carrier. Thereby a part of the stack switch carrier 2 is a somewhat U-shaped, freed bearing piece 10, which defines a middle recess, by means of which the bearing neck of the H-armature grips through and is there rotatably housed.

Both yoke branches 4, 5 are bent somewhat U-shaped and lie close together in the region of the coil interior tube 30, whereby both end sides of each yoke branch 4, 5 projects to opposite-lying sides of the drive coil 3.

Figure 3:
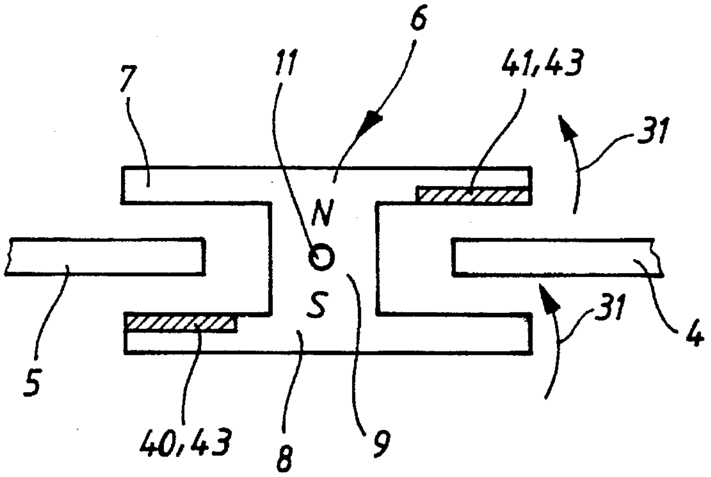
FIG. 3 is a schematic overview of the H-armature.

According to FIG. 3 the yoke branches 4, 5 grip into the space of the somewhat H-shape profiled H-armature, whereby the H-armature essentially consists of two anchor plates 7, 8 arranged parallel to each other, between which a permanent magnet 9 is arranged. The permanent magnet 9 is extruded together with the anchor plates 7, 8 whereby the anchor plates consist of a ferromagnetic material.

Figure 4:
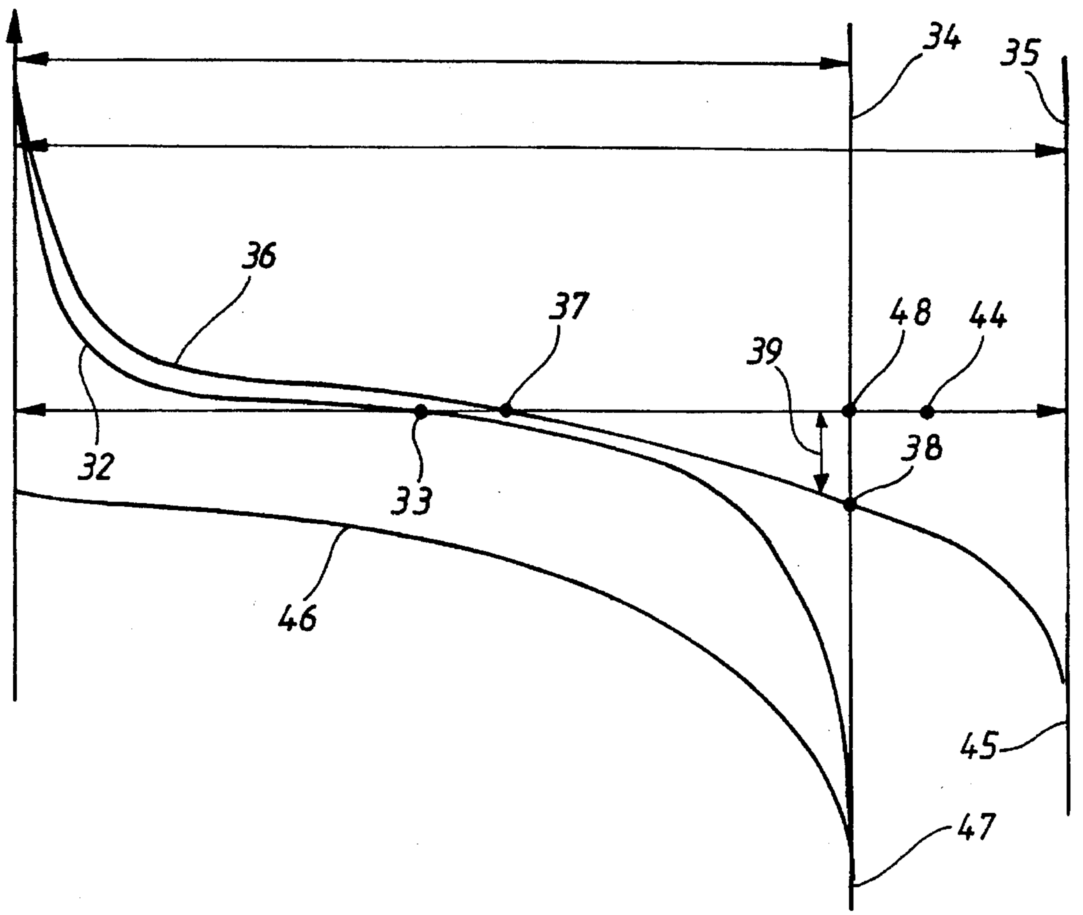
FIG. 4 shows the drive power lifting diagram for different H-armature designs.

The power lifting characteristic line of a symmetrical H-armature is represented by the curve 32 in the diagram of FIG. 4. Thus it follows that in the end position, the attainable final power is equally large and maximal, whereby the total lift of the H-armature is defined on one side by the ordinates of the diagram and on the other side by the straight lines 34.

At position 33 the intersection point ensues with the abscissa. At this point the drive power is zero.

In order to allow the symmetrically working H-armature 6 to work asymmetrically while retaining its mechanical symmetry, according to the invention, in the diagonal (relative to the rotational axis), opposite-lying parts of the armature plates 7, 8 arranged next to the yoke branches 4, 5, recesses 40, 41 are arranged, which are filled with a diamagnetic or paramagnetic material 43. This material can be a synthetic material or the like. By reason of these asymmetric, diagonal, opposite-lying armature plates 7, 8, the H-armature assumes a monostable position, since it turns in the direction of the arrow 31 in counterclockwise direction around its rotational axis 11 and lies alongside of the related yoke branches 4, 5 with the parts of the armature plates 7, 8 that lie opposite the recesses 40, 41.

In the diagram of FIG. 4, this means that by reason of the asymmetry according to FIG. 3, the lifting of the drive system is magnetically lengthened by the different 44 between the lines 34, 35.

The curve 36 arising therefrom then cuts the abscissa at position 37, whereby the distance between position 37 and position 36 corresponds to half of the difference 44. At the intersection point 38, this curve 36 cuts the line 34.

According to the invention, the lifting of the H-armature (that is the pivoting angle) is now mechanically limited.

Therewith the existing high end strength is limited at position 45; the curve is broken at the intersection point 38 with the lines 34 and the drive system now has only a residual strength 39. This residual strength 39 has the effect that if the H-armature 6 is brought into the swivel position opposite the direction of the arrow 31, this magnetic residual strength 39 works and this must be overcome by the stack switch in order to reach the resting position.

If one wants to bring the relay into the working position opposite the direction of the arrow 31, the residual strength 39 remains, which tries to hold this working position upright, and thereby must be overcome by the stack switch. If this power were to become too great, the relay would become bistable. One tries to make this residual strength 39 small; however it does not become zero, because otherwise the lifting force, among others, would be too strongly reduced.

The electromagnetic effect of the coil 3 is superimposed on the power lifting gradient of the curve 36. The curve 46 in FIG. 4 shows the resulting power lifting gradient, which works on the stack switch. In position 47 likewise an end strength is reached, which works on the stack switch. The power lifting gradient of the stack switch must run in the region between curve 37 and curve 46, in order to achieve a monostable behavior of the relay. If the power lifting gradient of the stack switch lies outside, that is, inside of the triangle bordered by the position 37, 38, 48, then the behavior of the relay becomes bistable.

In swinging the H-armature out of its resting position into the working position effected by the drive system, the actuator 20 in FIG. 1 is therewith moved upward and switches the individual contacts of the stack switch 16.

Thus several contacts are respectively arranged in individual compartments separated from each other, whereby the individual compartments are separated by means of chamber walls 14 (in the direction of the drive) and additional chamber walls 21, 22, 23. The outer boundary results from the face wall 24, at whose outer sides a readjusting spring 17 lies, which with a set screw 18 can have its resilience adjusted, and which with its free, rotating end lies alongside the outer side of the actuator 20.

A component of the stack switch carrier 2 is otherwise a plastic body 15, which covers the yoke branch in the direction toward the base plate 25.

Figure 2:
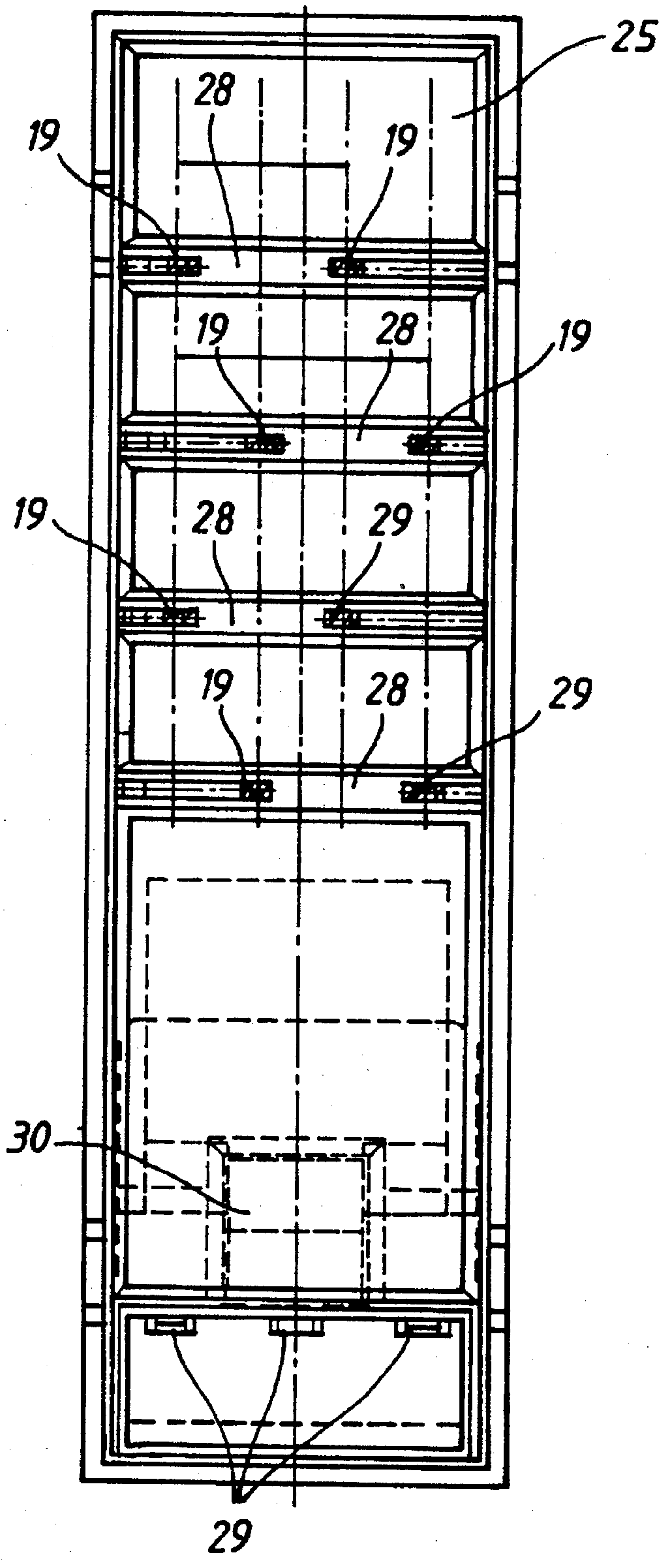
FIG. 2 is an overview on the base plate of a relay.

The contacts 16 are directed through the base plate 25 in the form of connection pins 19, whereby the base plate 25 is connected as one synthetic piece with the stack switch carrier 2. It is thus important that a large leakage distance is reached between the individual connection pins 19 lying next to each other according to FIG. 2. Hereby it is known to house the connection pins in slits 26, 27, whereby these slits are constructed from the outside of the base plates toward the inside. This enables a simple mounting of the connection pins 19 in these slits 26, 27.

On the front side of the stack switch carrier 2 are coil connections 29.

With the technical gauges according to the invention, a security relay with directed stack switch is therefore guaranteed, with which it is now for the first time possible, with a relatively small total dimension of the relay, to still guarantee a large contact interval, because with the use of the asymmetrically working H-armature a great lifting of the actuator 20 is achieved and thereby large contact intervals are made possible. The asymmetrical working of the H-armature has the advantage that in the resting position the contact of the stack switch is held in a defined position, without feedback of the anchor on the stack switch.

A further advantage of the invention lies therein, that through the use of an asymmetrically working H-armature 6, there is no undesired catching of bonded contacts, even if the current is significantly increased by means of the coil 3 of the drive system. It is important that even with an essential increase of the current conduction by means of the coil, the H-armature is only swung by reason of the difference of the magnetic fluxes between the opposite lying anchor plates 4, 5. This means that even when introducing higher currents into the coils of the drive system, the drive power on the contacts of the stack switch remains limited to a certain value, and therewith there is no danger that with a bonded closed contact, even open contacts could be closed, because the drive power is not sufficient to so deform or bend the stack switch, that this undesirable condition arises. This is an essential advantage of the asymmetrically working H-armature, which in connection with the described security concept (directed stack switch) leads to the result according to the invention.

Otherwise the H-armature 6 has a above-lying actuating plate 49, which is connected with the upper anchor plate 7 and alongside which the actuator 20 lies.

I claim:

1. Security relay with guided stack switch and polarized monostable drive, having individual contact stacks separated from each other and activated by a common actuator, characterized in that, for driving the actuator there is provided a mechanically symmetrical H-armature (6), which is constructed magnetically asymmetrical with a permanent magnet (9), the H-armature (6) is arranged with its longitudinal axis somewhat parallel to the longitudinal axis of a drive coil (3), whereby the rotational axis (11) of the H-armature (6) stands perpendicular to the longitudinal axis of the drive coil (3) and the actuator (20) is moved by an actuator plate (49) arranged in an elongation of the H-armature (6).

2. Security relay according to claim 1 further characterized in that, the H-armature (6) has two armature plates (7, 8) arranged parallel to each other, between which yoke branches (4, 5) reach, and located at diagonally opposite lying parts of the armature plates (7, 8) are asymmetrically arranged recesses which include a diamagnetic or paramagnetic material (43).

3. Security relay with guided stack switch and polarized monostable drive, having individual contact stacks separated from each other and actuated by a common actuator, whereby for driving the actuator, an H-armature is provided, which is arranged somewhat parallel to the longitudinal axis of the drive coil, characterized in that, the H-armature (6) is constructed mechanically symmetrical by means of two armature plates (7, 8) arranged parallel to each other, and is constructed magnetically asymmetrical by means of an arrangement of a permanent magnet (9) between the armature plates (7, 8), whereby the rotational axis (11) of the H-armature (6) stands perpendicular to the longitudinal axis of the drive coil (3) and is housed in a somewhat J-shaped housing piece (10) defined by the stack switch carrier (2), and the actuator (20) in the stack switch (16) is moved by an actuator plate (49) arranged in an elongation of the H-armature (6).

4. Security relay according to claim 3, further characterized in that, between the armature plates (7, 8), yoke branches (4, 5) extend, and located at diagonally opposite-lying parts of the armature plates (7, 8) are asymmetrically arranged recesses which have a diamagnetic or paramagnetic material.

* * * * *